(12) United States Patent
Martelli et al.

(10) Patent No.: US 12,244,571 B2
(45) Date of Patent: Mar. 4, 2025

(54) EMBEDDING INFORMATION USING PARTICLE-BASED SIMULATIONS

(71) Applicant: International Business Machines Corporation, Armonk, NY (US)

(72) Inventors: Fausto Martelli, Stockton Heath (GB); Malgorzata Jadwiga Zimon, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 17/658,320

(22) Filed: Apr. 7, 2022

(65) Prior Publication Data

US 2023/0328042 A1    Oct. 12, 2023

(51) Int. Cl.
    *H04L 9/40*    (2022.01)
(52) U.S. Cl.
    CPC ................. *H04L 63/0428* (2013.01)
(58) Field of Classification Search
    CPC .................................................. H04L 63/0428
    USPC .......................................................... 713/164
    See application file for complete search history.

(56) References Cited

U.S. PATENT DOCUMENTS

| | | | |
|---|---|---|---|
| 10,991,262 B2 * | 4/2021 | Delisle | G09B 19/165 |
| 11,238,190 B1 * | 2/2022 | Lu | G02B 27/0012 |
| 11,714,680 B2 * | 8/2023 | Campbell | G06F 9/5011 |
| | | | 718/104 |
| 2007/0061466 A1 | 3/2007 | Biran et al. | |
| 2014/0088940 A1 * | 3/2014 | Kobayashi | G06F 30/20 |
| | | | 703/9 |
| 2018/0027014 A1 * | 1/2018 | Irimie | H04L 63/1425 |
| | | | 726/22 |
| 2019/0347189 A1 * | 11/2019 | Chen | G06Q 20/341 |
| 2020/0042660 A1 * | 2/2020 | Teng | G06F 30/25 |
| 2020/0365236 A1 | 11/2020 | Park et al. | |
| 2020/0393840 A1 * | 12/2020 | Masuda | G06F 17/18 |
| 2021/0250223 A1 | 8/2021 | Lisle et al. | |
| 2021/0357554 A1 * | 11/2021 | Adolf | G06F 30/17 |
| 2022/0138377 A1 * | 5/2022 | Von Keler | G06F 30/20 |
| | | | 703/6 |

FOREIGN PATENT DOCUMENTS

JP    2020149617 A    9/2020

OTHER PUBLICATIONS

Kaundal et al., "DNA Based Cryptography: A Review," International Journal of Information & Computation Technology, ISSN 0974-2239, vol. 4, No. 7 (2014), pp. 693-698.
Ma et al., "A New Molecular Encryption Model Based on Microfluidic Techniques," 2019 J. Phys.: Conf. Ser. 1187 042052, 7 pgs.
(Continued)

*Primary Examiner* — Amare F Tabor
(74) *Attorney, Agent, or Firm* — Kelsey M. Skodje (57) ABSTRACT

A method, system, and computer program product are disclosed. The method includes generating simulation instances and particle site identifiers from a particle-based simulation. The method also includes providing an order metric for the particle-based simulation. Information is embedded in the particle-based simulation by mapping local order values of the order metric to characters of an input message.

20 Claims, 8 Drawing Sheets

(56) References Cited

OTHER PUBLICATIONS

Martelli et al., "A local order metric for condensed phase environments," arXiv:1609.03123v1 [physics.comp-ph] Sep. 11, 2016, 12 pgs.
Mell et al., "The NIST Definition of Cloud Computing," Recommendations of the National Institute of Standards and Technology, U.S. Department of Commerce, Special Publication 800-145, Sep. 2011, 7 pgs.
Steinhardt et al. "Bond-orientational order in liquids and glasses," Physical Review B, vol. 28, No. 2, Jul. 15, 1983, 22 pgs.

* cited by examiner

EMBEDDING INFORMATION USING PARTICLE-BASED SIMULATIONS

BACKGROUND

The present disclosure relates to data security, and more specifically, to information embedding and cryptography.

Information embedding (IE) is a technique that can be used for securing data. An IE algorithm can be used along with more conventional information protection techniques such as cryptography to create more secure systems. Information embedding, for example, into digital images can be performed in the real and in the reciprocal space (such as Fourier or Wavelet). Additional techniques aim to generate a so-called molecular code pad to conceal information. These methods include using DNA sequences or nanofluidic technology. Using DNA sequences, plaintext that is the message that is readable and understandable (uncoded or unencrypted) is represented by a unique base triplet. Using nanofluid technology relies on the non-linearity of fluids (e.g., in a droplet generating device) to encode large amounts of data.

SUMMARY

Various embodiments are directed to a method, which includes generating simulation instances and particle site identifiers from a particle-based simulation. The method also includes providing an order metric for the particle-based simulation. Information is embedded in the particle-based simulation by mapping local order values of the order metric to characters of an input message.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Aspects of the present disclosure relate generally to data security and, more specifically, to information embedding and cryptography. While the present disclosure is not necessarily limited to such applications, various aspects of the disclosure may be appreciated through a discussion of various examples using this context.

In the modern world, it is crucial and challenging to ensure and maintain data security. With the increase of computational power and the emergence of new technologies, such as quantum computing, there is a growing need to develop more sophisticated methods for protecting confidential information. One way to secure data is to hide it using an information embedding (IE) approach. An IE algorithm can be used along with more conventional information protection techniques such as cryptography to create more secure systems.

Information embedding, for example, into digital images, can be performed in the real and in the reciprocal space (such as Fourier or Wavelet). Recent works have been promoting a new direction of information security that aim to generate a so-called molecular code pad to conceal information. These methods include using DNA sequences or nanofluidic technology. Using DNA sequences as an encryption scheme benefits from the vast storage capacity of DNA. Using DNA sequences, plaintext that is the message that is readable and understandable (uncoded or unencrypted) is represented by a unique base triplet. Using nanofluid technology relies on the non-linearity of fluids (e.g., in a droplet generating device) to encode large amounts of data. However, these methods can lack flexibility in how the information is presented. They can also suffer from the possibility of the key and data being intercepted.

Disclosed herein are techniques for embedding information using particle-based simulations (e.g., molecular dynamics simulations) by using local order metrics. This can be carried out by embedding information in a particle-based simulation by using a local order value for an identified particle site (e.g., a particle site or a site of an atom or collection of atoms) at a simulation instance in the simulation. A simulation instance may be obtained at a time instance or snapshot of the simulation. The order metric is pre-agreed and the obtained local order values are mappable to characters of a message so that the message is embedded in the simulation. The order metric provides a local estimation of order at the identified particle site at a given simulation instance and is a measure of closeness of the local atomic neighborhoods to a particular molecular pattern.

Information embedding techniques require the following three main qualities: imperceptibility, capacity, and robustness against various processing attacks. Particle-based simulations can describe the evolution of atoms and molecules in processes such as, for example, the melting of a crystal, the interaction of solvents with surfaces, the folding of proteins, etc. When the number of particles involved in a simulation is large, it is impossible to track each single atomic displacement and link it to its neighbors with visual analysis. A human brain is simply not tuned to identifying structures and patterns in large atomic ensembles unless the atomic arrangement in space is very ordered. Therefore, if information is embedded in a particle-based system, even if it is intercepted, the message will not be clear to anyone unless they can devise an exact order metric used by the sender and receiver. This provides imperceptibility.

In addition, numerous protocols for encryption may be used to combine with a random key generator to give no information about the plaintext. This provides information capacity and robustness. Given a truly random key that is used only once, together with a huge number of possible combinations of molecular structures (limited only by the size of the computational system) a ciphertext can be translated into any plaintext of the same length, and all are equally likely.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
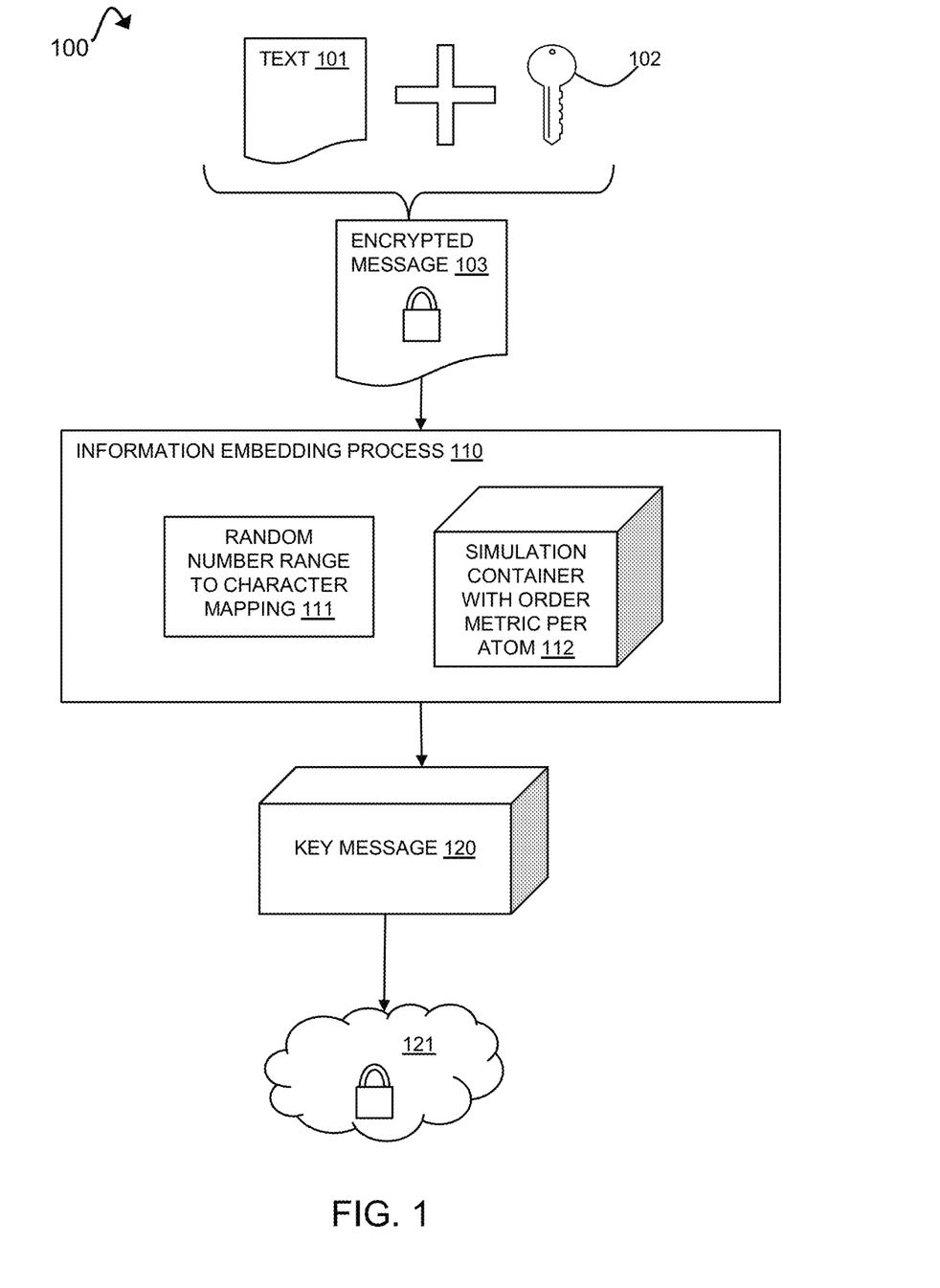
FIG. 1 is a schematic diagram illustrating an example information embedding process, according to some embodiments of the present disclosure.

Turning now to the figures, FIG. 1 is a schematic diagram illustrating an example information embedding process 110, according to some embodiments of the present disclosure. A text 101 may be encrypted with a cryptographic key 102 to result in an encrypted message 103 (input message for process 110). The input message may be formed of characters. The characters may be letters, digits, or other characters suitable for encryption. The information embedding process 110 is described that includes two main components: a random number range-to-character mapping executable 111 (also referred to herein as a number-to-character mapping executable) and a simulation container 112 with an order metric per particle site at a given simulation instance.

The simulation container 112 may provide an N-dimensional (where N is the number of dimensions) representation of a time evolution of particles in a given process. For example, the simulation can be a three-dimensional representation of a time evolution of particles in a given process. Each particle in a simulation instance (for example, at a snapshot) has a site or position in the simulation. The site of a particle may be identified using its coordinates in space. In an example of a simulation with N atoms, each atom may be labeled from 1 to N and an atomic site is a given atom in the simulation container.

The number-to-character mapping executable 111 has the role of mapping a number range that provides a value of order metric to a character and vice versa. The simplest mapping may be a range of values obtained by dividing the range from 0 (disorder) to 1 (order) by the number of characters. The mapping of numbers to characters may be generated at random. Local order values are mappable to characters of an input message so that the input message may be embedded in the simulation 112.

The particle-based simulation 112 is used to embed information by using a local order value for an identified particle site at a simulation instance in the simulation. A computer simulation snapshot in the form of a frozen instantiation of a modelled particle system may be used. A containerized simulation may be shared, for example, using Docker® software (Docker is a trademark of Docker, Inc.)

The order metric provides a local estimation of order at the identified particle site at a given simulation instance. In one embodiment, the order metric is a measure of closeness of the local atomic neighborhoods to a particular molecular pattern. Other order metrics may be adopted such as, for example, metrics based on spherical harmonics.

A key message 120 may then be generated in the form of the encrypted message embedded in the molecular simulation. The key message 120 is shared and takes the form of a series of pairs of particle site identifiers and simulation instances that point to the simulation that can be used to extract the order values for conversion back to the input message. This can be shared securely via a cloud 121 implementation.

The described method can use real atomistic and molecular systems to embed information. This may be used to enable the transmission of encrypted data using physical particle-based structures for representing information. As there can be many particles with the same configurations, there are multiple possibilities for information embedding.

Figure 2:
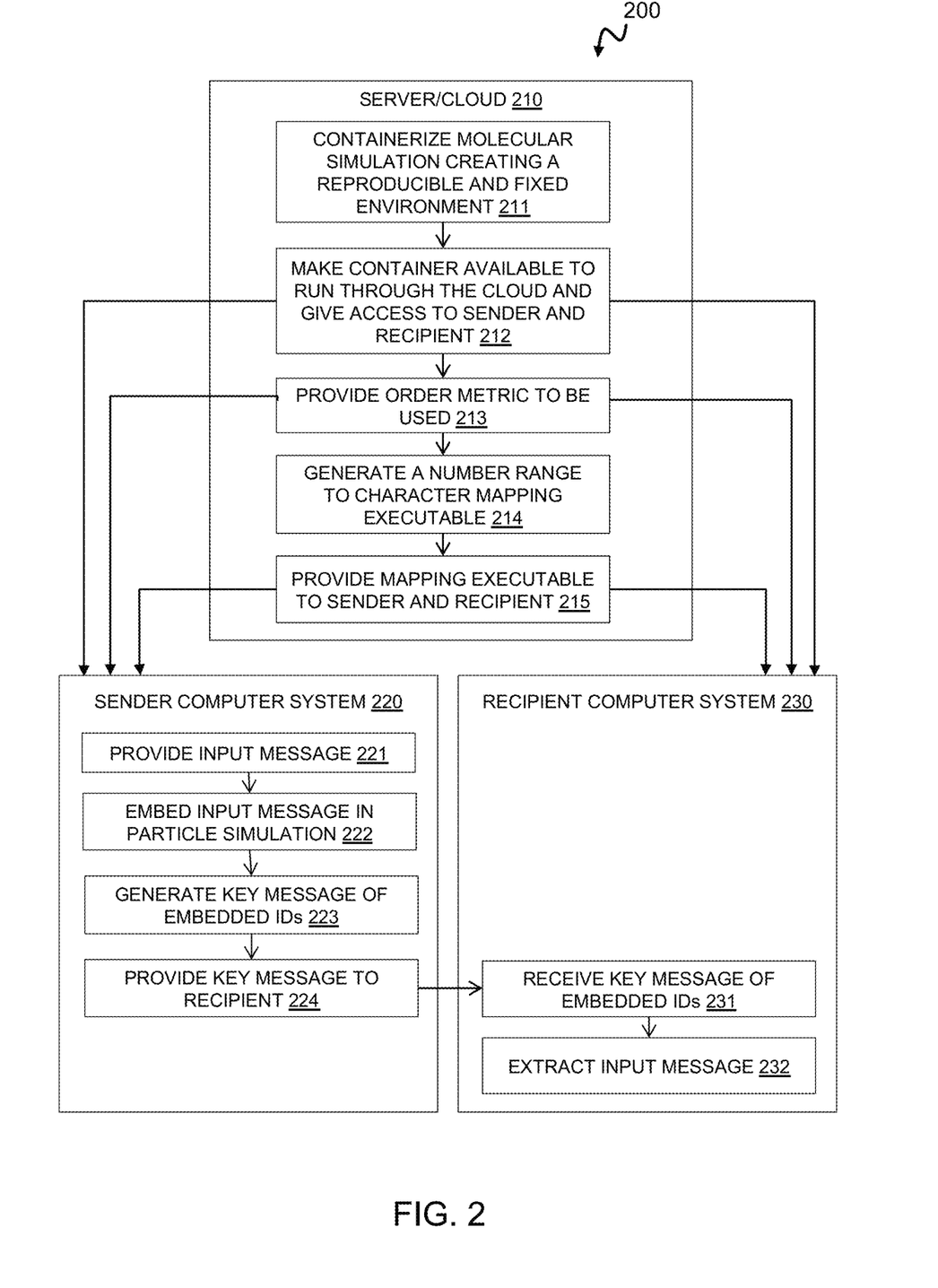
FIG. 2 illustrates a process of sending and receiving embedded information, according to some embodiments of the present disclosure.

FIG. 2 illustrates a process 200 of sending and receiving embedded information, according to some embodiments of the present disclosure. Process 200 can be carried out using a server or cloud 210, a sender computer system 220 for embedding information, and a recipient computer system 230 for receiving the embedded information. The operations shown in FIG. 2 may be carried out in a different order in some embodiments. The simulation may be containerized by the sender computer system 220 for sharing with the recipient computer system 230. Alternatively, a server 210 may provide the simulation to both the sender computer system 220 and the recipient computer system 230.

The server 210 may be a cloud server for virtualizing an operating system to provide a platform as a service to deliver software in packages called containers. The server 210 can containerize a particle-based simulation to create a reproducible and fixed environment. This is illustrated at operation 211. For example, the simulation may be containerized using Docker and/or Apptainer/Singularity, allowing the whole operating system to be virtualized. The container can be made available to be run through the cloud with access provided to the sender computer system 220 and the recipient computer system 230. This is illustrated at operation 212.

Information is embedded in a particle-based simulation by using a local order value for an identified particle site at a time instance in the simulation. The order metric provides a local estimation of order at the identified particle site at a given time instance and is a measure of closeness of the local atomic neighborhoods to a particular molecular pattern.

A key message may then be generated and shared, providing pairs of simulation instances and identified particle sites in the simulation that can be used to extract the order values for conversion back to the input message.

An agreed order metric to be used in association with the simulation may be provided to the sender and recipient. This is illustrated at operation 213. In some embodiments, there can be a different order metric per communication channel to provide additional security. A number-to-character mapping executable can be generated. This is illustrated at operation 214. Local order values can be mappable to characters of an input message so that the input message may be embedded in the simulation. The generated mapping executable can be provided to the sender computer system 220 and the recipient computer system 230. This is illustrated at operation 215. The executable can have the sole role of mapping a number, such as a value of order metric, to a character. In some embodiments, the simplest mapping may be a range of values obtained by dividing a number range (for example, from 0 (disorder) to 1 (order)) by the number of characters. The mapping of numbers to characters may be generated at random by the executable.

The sender computer system 220 may provide an input message, which may be an encrypted message. This is illustrated at operation 221. The sender computer system 220 can use the mapping executable and the containerized simulation to convert the input message to order values and embed these in the molecular simulation. This is illustrated at operation 222. The sender computer system 220 generates a key message identifying time instances and atomic identifiers of the embedded information in the simulation. This is illustrated at operation 223. The sender computer then outputs the key message to the recipient computer system 230. This is illustrated at operation 224.

The recipient computer system 230 receives the output key message of embedded identifiers. This is illustrated at operation 231. The recipient computer system 230 then extracts the input message by using the containerized simulation and the mapping executable. This is illustrated at operation 232.

Figure 3A:
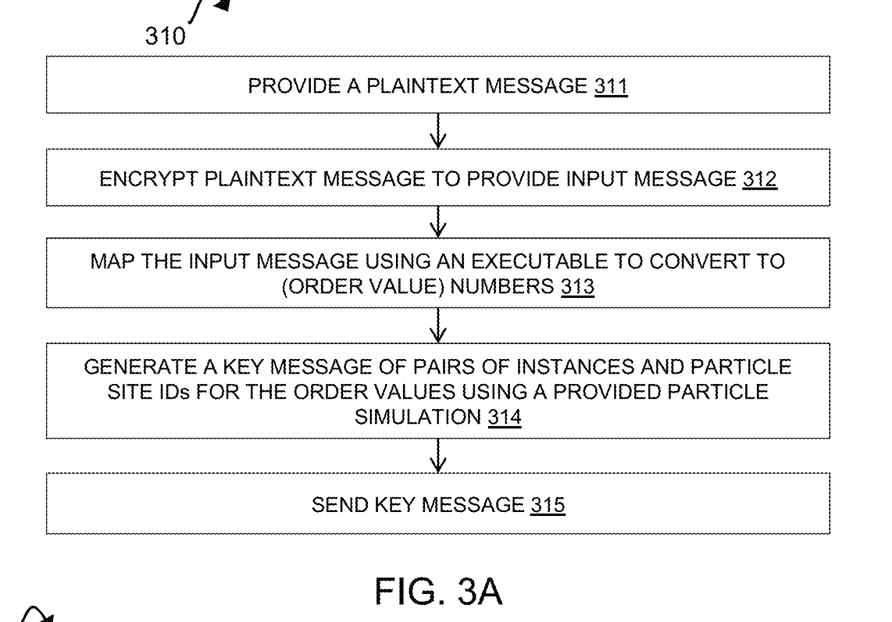
FIGS. 3A and 3B are flow diagrams of example processes carried out at a sender computer system and a recipient computer system, respectively, according to some embodiments of the present disclosure.
Figure 3B:
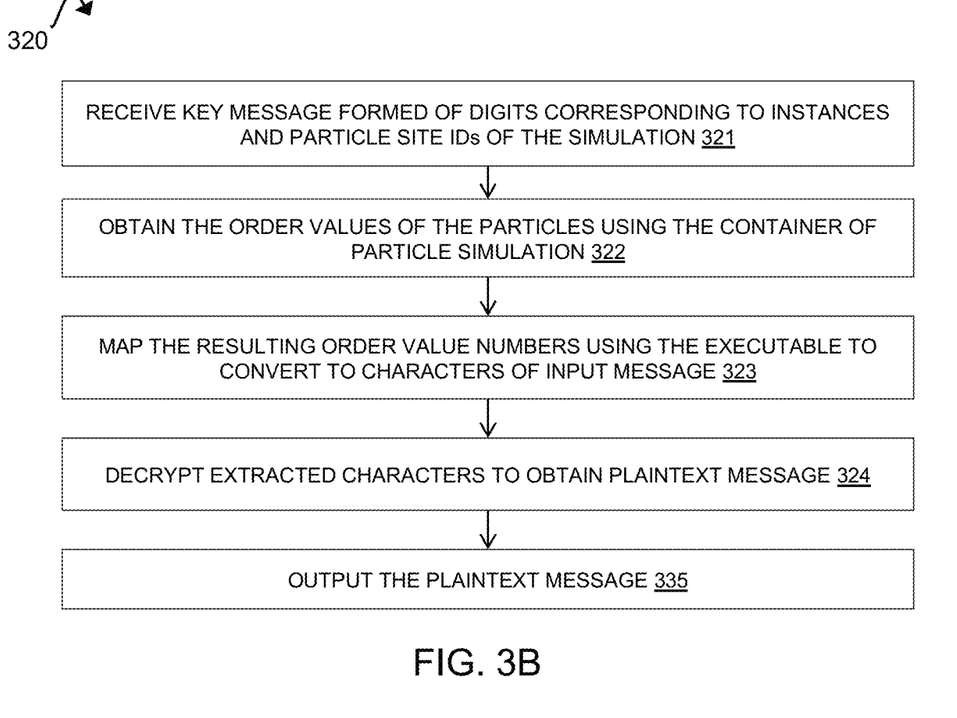

FIGS. 3A and 3B are flow diagrams of example processes 310 and 320 carried out at the sender computer system 220 and recipient computer system 230, respectively, according to some embodiments of the present disclosure.

Process 310 can include providing a plaintext message for input. This is illustrated at operation 311. The plaintext message can be the original message that is readable and understandable, uncoded or unencrypted. The plaintext message can be encrypted to provide an input message for embedding. This is illustrated at operation 312. Once the plaintext goes through the coding process and is encrypted, the input message may be a string of characters and may be readable but not understandable. In other embodiments, the input message may be a plaintext message.

The series of characters of the input message can be mapped to a series of order values. This is illustrated at operation 313. The mapping at operation 313 can use an executable to convert each character of the input message to a value in a number range. The executable may provide a random mapping Process 310 can include generating a key message of pairs of time instances and particle site identifiers (IDs) of the simulation corresponding to the order values of the mapping. This is illustrated at operation 314. This key message can reference the embedded information in the simulation. The key message can then be sent to a recipient. This is illustrated at operation 315.

In some embodiments, to enable the use of information embedding for cryptography, the text represented by atoms positions may be further combined with a randomly generated key (one-time pad) of the same length as the message. A one-time pad pairs a text with a random secret key to generate a ciphertext. In other embodiments, cryptographic uses can be enabled by incorporating a randomly generated key at the level of choosing the atomic positions that correspond to a given mapping.

Referring now to FIG. 3B, process 320 can include receiving a key message in the form of a series of pairs of time instances and particle site identifiers of a simulation. This is illustrated at operation 321. The simulation can be a shared simulation with each pair corresponding to a discrete order value of the order metric of the simulation. In each time-step or snapshot, there can be many atomic sites with different local order metrics.

The order values may be obtained from the pairs of time instances and particle site identifiers of the simulation. This is illustrated at operation 322. The obtained order values can be mapped to characters to obtain an input message. This is illustrated at operation 323. For example, the executable can be used to convert the order values into characters of the input message from process 310. The characters extracted at operation 323 can then be decrypted to obtain the original plaintext message. This is illustrated at operation 324. The plaintext message can then be output at operation 335.

As discussed above, the processes disclosed herein can be used to conceal information in computationally generated atomistic structures. This may allow any amount of data to be incorporated in an atomistic simulation. Techniques known in the art for mapping characters onto a local estimation of order and incorporating a metric can be used. For example, local order metrics based on Gaussian similarity kernels may be used. In an example of this, the local order surrounding a particle site j can be computed by (i) locating the position of M neighbors of j and (ii) maximizing the space overlap between the M neighbors and a given reference structure. From (ii), a number between 0 and 1 can measure the degree of order, with 1 corresponding to the perfect overlap between the reference structure and the geometrical arrangement of the M neighbors.

To illustrate the information embedding procedure, the dynamical behavior of a simple atomic liquid is simulated herein by employing molecular dynamics. However, it is noted that the type of simulation or the order metric may be chosen freely without influencing the effectiveness of the embedding strategy. The following steps describe the example approach for concealing a message "Hello IDT" in the given setting.

The sender (e.g., sender 220) containerizes the molecular simulation using Docker (and/or Singularity), allowing the whole operating system to be virtualized, creating a reproducible and fixed environment.

The container is made available to run through the cloud and the access is given to the recipient (e.g., recipient 230) together with an executable for mapping a number (in this case the value of order) to a letter. The mapping of numbers to letters can be generated at random. In the given scenario, the executable maps the range spanning values from 0.4 (min order level identified in the simulation) to 1 and divided into 26 chunks (26 letters in the Latin alphabet). For example, there can be a range of values (0.562, 0.585) corresponding to the letter "H". The exact correspondence is hidden from the recipient and, if intercepted, can prevent decoding of the information as the values of order for each atom need to be extracted from the snapshots first before running the translation.

A key message of the form: "time_step—particle site 1—particle site 2; time_step—particle site 1—particle site 2; . . . " is generated to identify one or more particle sites for time-steps or snapshots having the order metric value. The recipient receives the key message, together with the containerized simulation, and the binary performing order-to-letter mapping. The key message corresponds to the time-steps and the particle site identifiers in the simulation container. The recipient calculates the order value for these atoms and pass these numbers to the binary. Here, the order value is understood as the closeness of the local atomic neighborhoods to a particular pattern (e.g., a crystal structure or other reference structure/arrangement).

Figure 4:
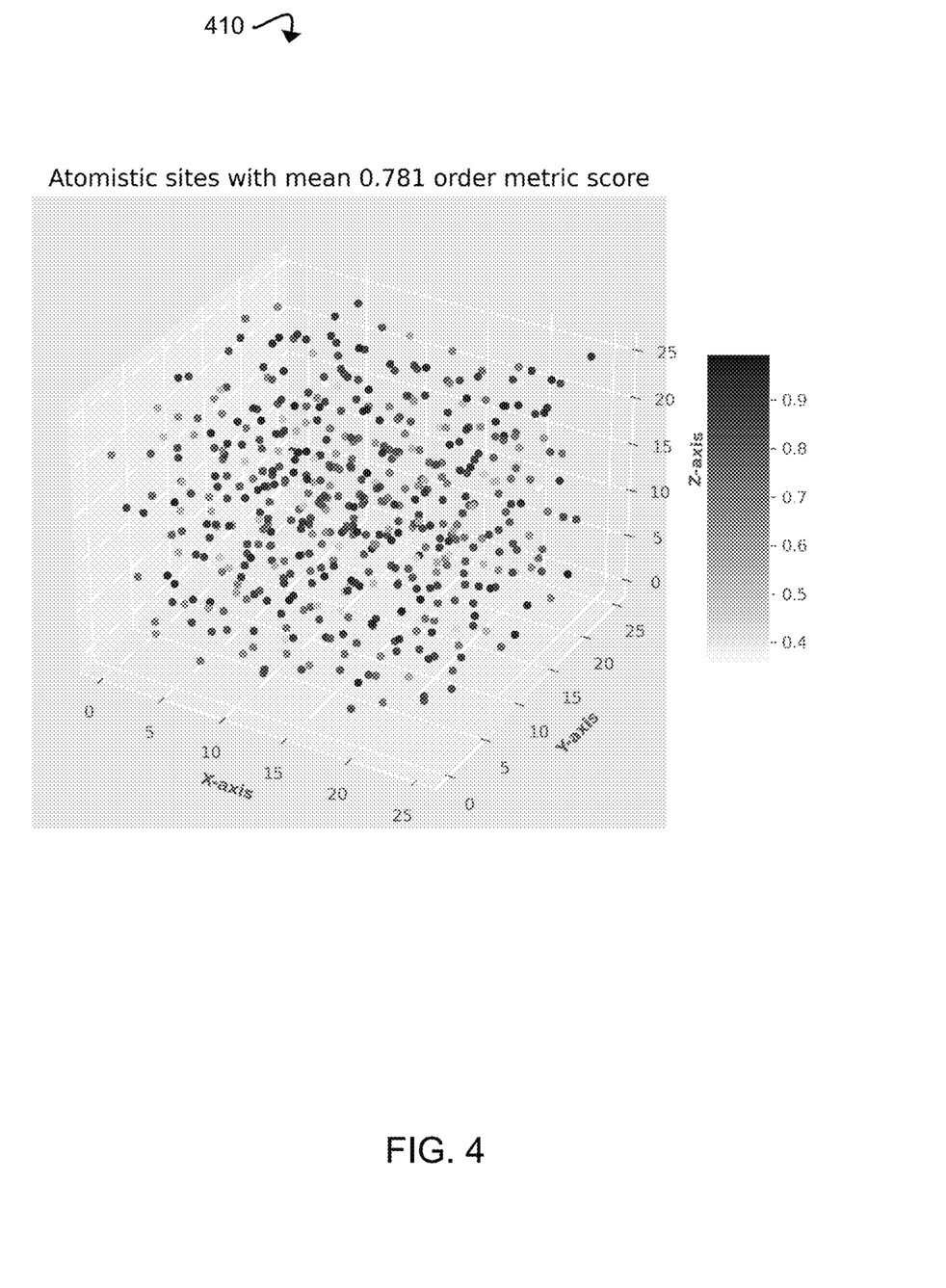
FIG. 4 is a diagram illustrating a distribution of particle sites of an order metric in a simulation container at a simulation instance, according to some embodiments of the present disclosure.

FIG. 4 shows an illustration 410 of a distribution of particle sites of an order metric in a simulation container at a simulation instance, according to some embodiments of the present disclosure. In this example. the order metric is a Geometry Matching (GeM) order metric. FIG. 4 shows the particle sites having a mean order metric of 0.781 GeM score at a time instance.

Continuing the above example, applying the order metric of FIG. 4 returns the following numbers: "0.568649-0.509867-0.666657-0.663137-0.746456-0.596499-0.47907-0.851177", which are then converted back to letters revealing the message: "H-E-L-L-O-I-D-T".

The order metric can be agreed upon beforehand and can be changed per communication channel. The number-to-character mapping can be random (e.g., uniformly distributed and independent of the plaintext). The randomly generated translator influences the choice of molecules which have the corresponding level of order. As there can be many particles with the same configurations, there are multiple possibilities for information embedding. This feature makes the process resistant to frequency and interval analysis tools, which can reveal how encrypted information was constructed by correlating it with the knowledge of how frequently certain letters tend to appear in text.

Both embedding and extraction algorithms such as those discussed above can be lightweight. The efficiency of the process can be further improved using pre-trained matching algorithms. Conversion from numbers to letters may be performed in a fraction of a second.

The process of obtaining the local order metric can be done, for example, by performing shape-matching every time coding/decoding takes place. A pre-trained algorithm may be applied to digest simulation snapshots and map the information onto local order metrics. The training process may include performing the shape-matching for a range of different settings and optimizing some weighting coefficients of a mapping function. In some embodiments, the generation of molecular data can be accelerated with the use of cloud resources.

Particle-based simulations can involve many time-steps. However, the message may be fully embedded into the atomic snapshot after only one time-step if needed. In order to increase the complexity of the system and, hence, the complexity of the encryption, one can choose from the following possibilities: (1) many (more than one) time-steps with many atoms, (2) many (more than one) time-steps with few atoms, (3) one time-step with many atoms, and (4) one time-step with few atoms. Options 1 and 2 provide complexity with many time-steps. In options 3 and 4, only one time-step is simulated, and information is embedded in the simulation container. The encryption is still complex in option 3, where many atoms may have countless configurations, although option 4 may have insufficient complexity in some embodiments.

Figure 5:
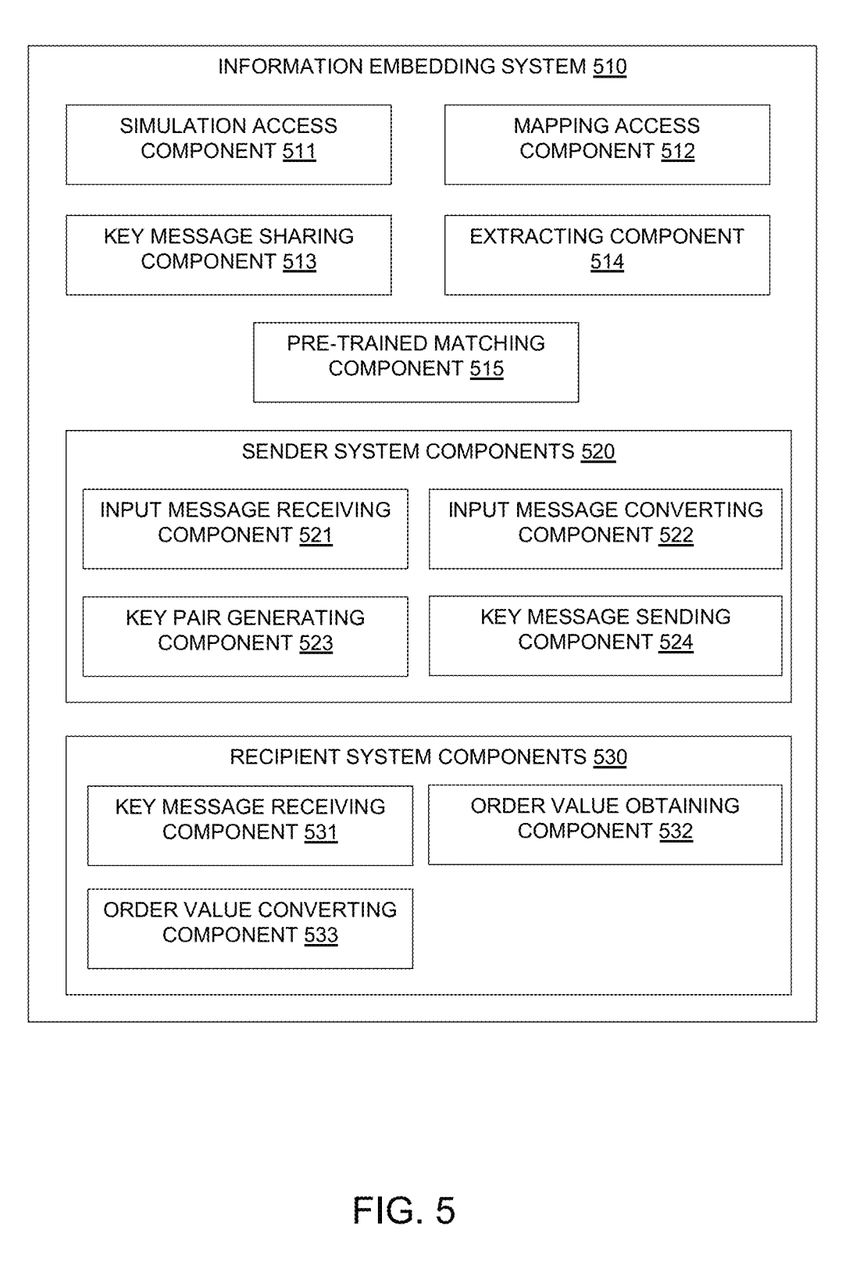
FIG. 5 is a block diagram illustrating an information embedding system, according to some embodiments of the present disclosure.

FIG. 5 is a block diagram illustrating an information embedding system 510, according to some embodiments of the present disclosure. The information embedding system 510 may embed information in a particle-based simulation by using a local order value of an agreed order metric for a simulation instance/particle site identifier pair. The information embedding system 510 may include a simulation access component 511 for providing access to a particle-based simulation and a mapping access component 512 for providing access to a number-to-character mapping executable for mapping a range of local order values of an agreed order metric of the simulation.

The information embedding system 510 may include a key message sharing component 513 for sharing a key message between a sender and a recipient of a series of pairs of simulation instances and particle site identifiers of the simulation, with each pair corresponding to a discrete order value of the order metric of the simulation.

The information embedding system 510 may include an extracting component 514 for extracting the embedded information by finding a simulation step and a particle site identifier in the simulation and obtaining a local order value.

The information embedding system 510 may include a pre-trained matching component 515 for matching a simulation instance/particle site identifier pair to a local order value using pre-trained matching algorithms.

The sender system components 520 may include an input message receiving component 521 for receiving an input message to be embedded and an input message converting component 522 for mapping characters of the input message to a series of order values using the mapping access component 512. The sender system components 520 may also include a key pair generating component 523 for generating pairs of simulation instances and particle site identifiers corresponding to the order values. The sender system components 520 may also include a key message sending component 524 for generating and sending the series of simulation instances and particle site identifiers as a key message to the embedded information in the simulation.

The recipient system components 530 may include a key message receiving component 531 for receiving a key message in the form of a series of pairs of simulation instances and particle site identifiers of the simulation, each pair corresponding to a discrete order value of the order metric of the simulation. The recipient system components 530 may include an order value obtaining component 532 for obtaining the order values from the pairs of simulation instances and particle site identifiers by using the simulation access component 511. The recipient system components 530 may include an order value converting component 533 for converting the obtained order values to characters using the mapping access component 512 to obtain an input message.

Figure 6:
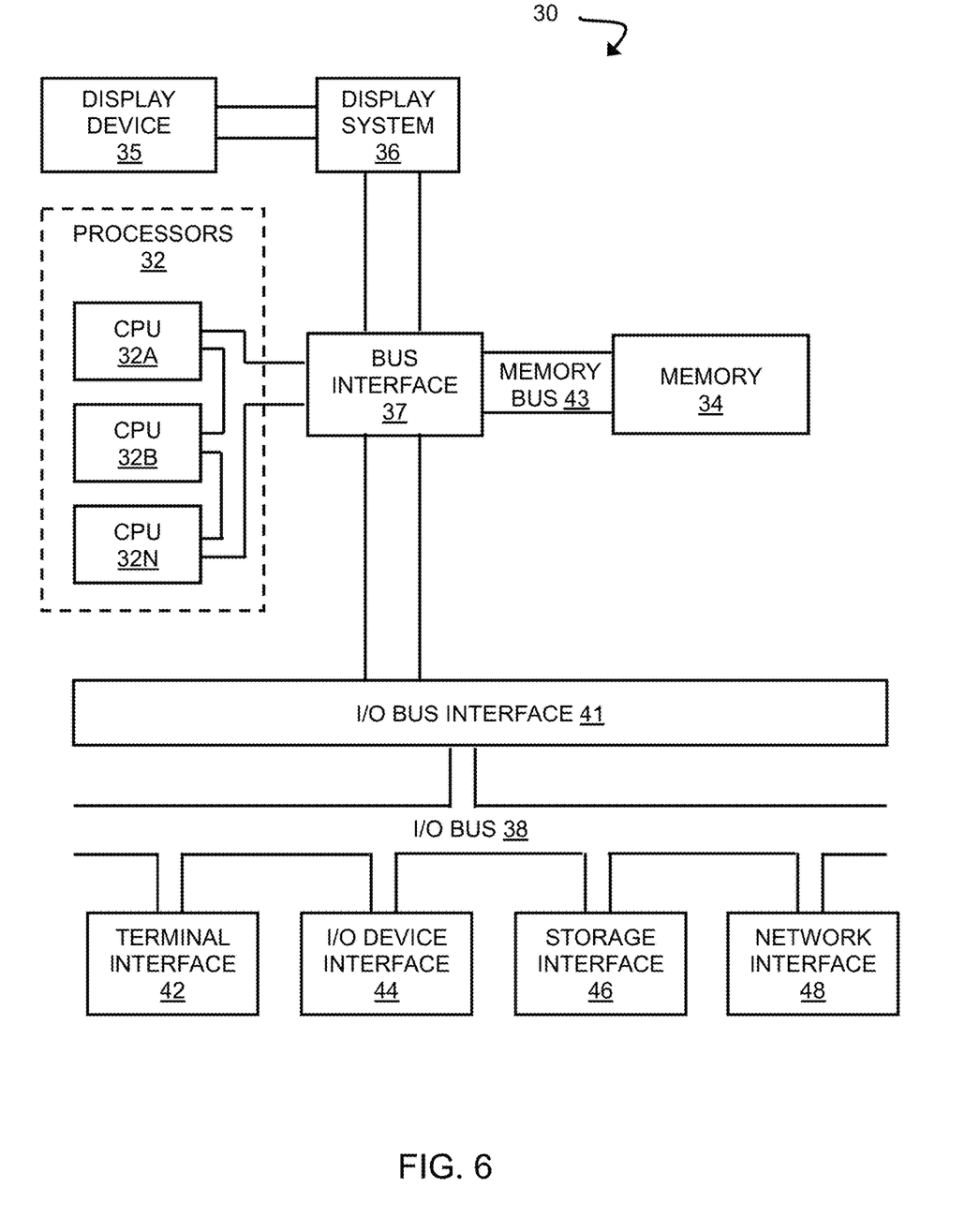
FIG. 6 is a block diagram illustrating a computer system, according to some embodiments of the present disclosure.

FIG. 6 is a block diagram illustrating an exemplary computer system 30 that can be used in implementing one or more of the methods, tools, components, and any related functions described herein (e.g., using one or more processor circuits or computer processors of the computer). In some embodiments, the major components of the computer system 30 comprise one or more processors 32, a memory subsystem 34, a terminal interface 42, a storage interface 46, an input/output device interface 44, and a network interface 48, all of which can be communicatively coupled, directly or indirectly, for inter-component communication via a memory bus 33, an input/output bus 38, bus interface unit 37, and an input/output bus interface unit 41.

The computer system 30 contains one or more general-purpose programmable central processing units (CPUs) 32A, 32B, and 32N, herein collectively referred to as CPU 32. In some embodiments, the computer system 30 contains multiple processors typical of a relatively large system; however, in other embodiments the computer system 30 can alternatively be a single CPU system. Each CPU 32 may execute instructions stored in the memory subsystem 34 and can include one or more levels of on-board cache.

The memory 34 can include a random-access semiconductor memory, storage device, or storage medium (either volatile or non-volatile) for storing or encoding data and programs. In some embodiments, the memory 34 represents the entire virtual memory of the computer system 30 and may also include the virtual memory of other computer systems coupled to the computer system 30 or connected via a network. The memory 34 is conceptually a single monolithic entity, but in other embodiments the memory 34 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

Components of system 510 (FIG. 5) can be included within the memory 34 in the computer system 30. However, in other embodiments, some or all of these components may be on different computer systems and may be accessed remotely, e.g., via a network. The computer system 30 may use virtual addressing mechanisms that allow the programs of the computer system 30 to behave as if they only have access to a large, single storage entity instead of access to multiple, smaller storage entities. Thus, components of the memory 34 are not necessarily all completely contained in the same storage device at the same time. Further, although components of system 510 are illustrated as being separate entities, in other embodiments some of these components, portions of some of these components, or all of these components may be packaged together.

In an embodiment, components of system 510 include instructions that execute on the processor 32 or instructions that are interpreted by instructions that execute on the processor 32 to carry out the functions as further described in this disclosure. In another embodiment, components of system 510 are implemented in hardware via semiconductor devices, chips, logical gates, circuits, circuit cards, and/or other physical hardware devices in lieu of, or in addition to, a processor-based system. In another embodiment, components of system 510 include data in addition to instructions.

Although the memory bus 33 is shown in FIG. 6 as a single bus structure providing a direct communication path among the CPUs 32, the memory subsystem 34, the display system 36, the bus interface 37, and the input/output bus interface 41, the memory bus 33 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 41 and the input/output bus 38 are shown as single respective units, the computer system 30 may, in some embodiments, contain multiple input/output bus interface units 41, multiple input/output buses 38, or both. Further, while multiple input/output interface units are shown, which separate the input/output bus 38 from various communications paths running to the various input/output devices, in other embodiments some or all of the input/output devices may be connected directly to one or more system input/output buses.

The computer system 30 may include a bus interface unit 37 to handle communications among the processor 32, the memory 34, a display system 36, and the input/output bus interface unit 41. The input/output bus interface unit 41 may be coupled with the input/output bus 38 for transferring data to and from the various input/output units. The input/output bus interface unit 41 communicates with multiple input/output interface units 42, 44, 46, and 48, which are also known as input/output processors (IOPs) or input/output adapters (IOAs), through the input/output bus 38. The display system 36 may include a display controller. The display controller may provide visual, audio, or both types of data to a display device 35. The display system 36 may be coupled with a display device 35, such as a standalone display screen, computer monitor, television, or a tablet or handheld device display. In alternate embodiments, one or more of the functions provided by the display system 36 may be on board a processor 32 integrated circuit. In addition, one or more of the functions provided by the bus interface unit 37 may be on board a processor 32 integrated circuit.

In some embodiments, the computer system 30 is a multi-user mainframe computer system, a single-user system, or a server computer or similar device that has little or no direct user interface but receives requests from other computer systems (clients). Further, in some embodiments, the computer system 30 is implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 30. In some embodiments, however, individual components may have greater or lesser complexity than as represented in FIG. 6, Components other than or in addition to those shown in FIG. 6 may be present, and the number, type, and configuration of such components may vary.

In some embodiments, the data storage and retrieval processes described herein could be implemented in a cloud computing environment, which is described below with respect to FIGS. 7 and 8. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
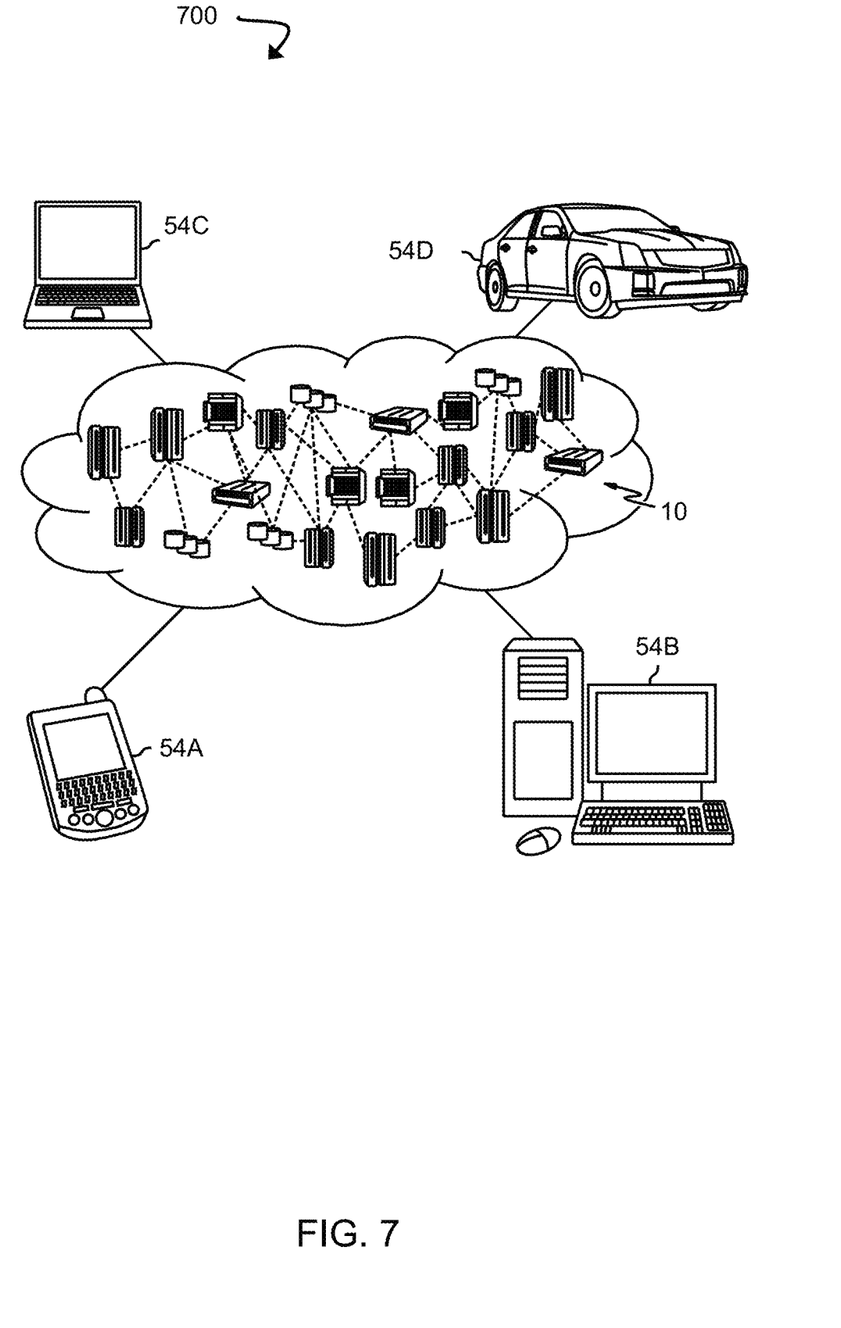
FIG. 7 is a block diagram illustrating a cloud computing environment, according to some embodiments of the present disclosure.

FIG. 7 is a block diagram illustrating a cloud computing environment 700, according to some embodiments of the present disclosure. As shown, cloud computing environment 700 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54D may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 54A-54D shown in FIG. 8 are intended to be illustrative only and that computing nodes 10 and cloud computing environment 700 can communicate with any type of computerized device over any type of network and/or network addressable connection (e.g., using a web browser).

Figure 8:
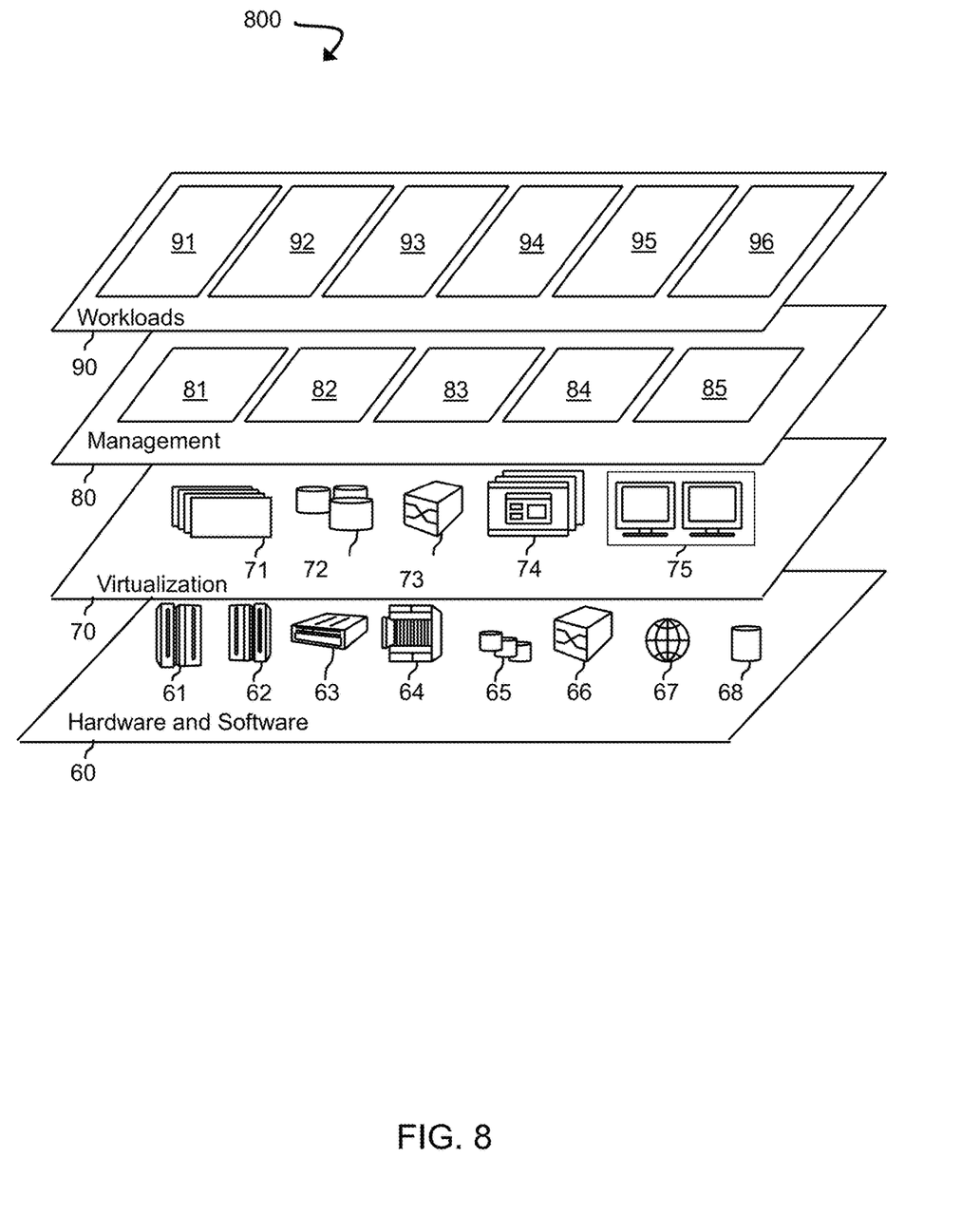
FIG. 8 is a block diagram illustrating a set of functional abstraction model layers provided by the cloud computing environment, according to some embodiments of the present disclosure.

FIG. 8 is a block diagram illustrating a set of functional abstraction model layers 800 provided by the cloud computing environment 700, according to some embodiments of the present disclosure. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions that can be provided from this layer include: mapping and navigation 91; software development and lifecycle management 92; virtual classroom education delivery 93; data analytics processing 94; transaction processing 95; and embedding information using particle-based simulations 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, and item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A method, comprising:
   generating simulation instances and particle site identifiers from a particle-based simulation;
   providing an order metric for the particle-based simulation; and
   embedding information in the particle-based simulation, wherein the embedding comprises mapping local order values of the order metric to characters of an input message.

2. The method of claim 1, further comprising extracting the information, wherein the extracting comprises:
   locating a pair of the simulation instances and the particle site identifiers from the particle-based simulation; and
   obtaining, for the located pair, a corresponding local order value of the order metric.

3. The method of claim 1, further comprising generating a key message that includes pairs of the simulation instances and the particle site identifiers corresponding to the mapped local order values.

4. The method of claim 3, further comprising sending the key message to a recipient.

5. The method of claim 3, further comprising:
   obtaining, based on the key message, the mapped local order values corresponding to the pairs of the simulation instances and the particle site identifiers; and
   converting the mapped local order values to the characters of the input message.

6. The method of claim 1, wherein the particle-based simulation is containerized to provide a reproducible environment via cloud computing resources.

7. The method of claim 1, wherein the particle-based simulation is a three-dimensional representation of a time evolution of particles in a given process.

8. The method of claim 1, wherein the mapping comprises generating a random mapping of the characters to a range of values of the order metric.

9. The method of claim 1, wherein the order metric provides a local estimation of order at an identified particle site at a given simulation instance and is a measure of closeness of local atomic neighborhoods to a given molecular pattern.

10. The method of claim 1, wherein the order metric is provided to a first communication channel, and wherein a different order metric for the particle-based simulation is provided to a second communication channel.

11. The method of claim 1, wherein the input message is combined with a randomly generated key.

12. The method of claim 1, wherein the mapped local order values include randomly generated numbers added to values of the order metric.

13. The method of claim 1, further comprising matching a pair of the simulation instances and the particle site identifiers to a local order value of the order metric.

14. A system, comprising:
   a memory; and
   a processor communicatively coupled to the memory, wherein the processor is configured to perform a method comprising:
      generating simulation instances and particle site identifiers from a particle-based simulation;
      providing an order metric for the particle-based simulation; and
      embedding information in the particle-based simulation, wherein the embedding comprises mapping local order values of the order metric to characters of an input message.

15. The system of claim 14, wherein the method further comprises extracting the information, and wherein the extracting comprises:
   locating a pair of the simulation instances and the particle site identifiers from the particle-based simulation; and
   obtaining, for the located pair, a corresponding local order value of the order metric.

16. The system of claim 14, wherein the method further comprises generating a key message that includes pairs of the simulation instances and the particle site identifiers corresponding to the mapped local order values.

17. The system of claim 16, wherein the method further comprises sending the key message to a recipient.

18. The system of claim 16, wherein the method further comprises:
   obtaining, based on the key message, the mapped local order values corresponding to the pairs of the simulation instances and the particle site identifiers; and
   converting the mapped local order values to the characters of the input message.

19. The system of claim 14, wherein the method further comprises matching a pair of the simulation instances and the particle site identifiers to a local order value of the order metric.

20. A computer program product, the computer program product comprising a computer readable storage medium having program instructions embodied therewith, the program instructions executable by a processor to cause a device to perform a method, the method comprising:
   generating simulation instances and particle site identifiers from a particle-based simulation;
   providing an order metric for the particle-based simulation; and
   embedding information in the particle-based simulation, wherein the embedding comprises mapping local order values of the order metric to characters of an input message.

* * * * *